United States Patent Office 3,725,268
Patented Apr. 3, 1973

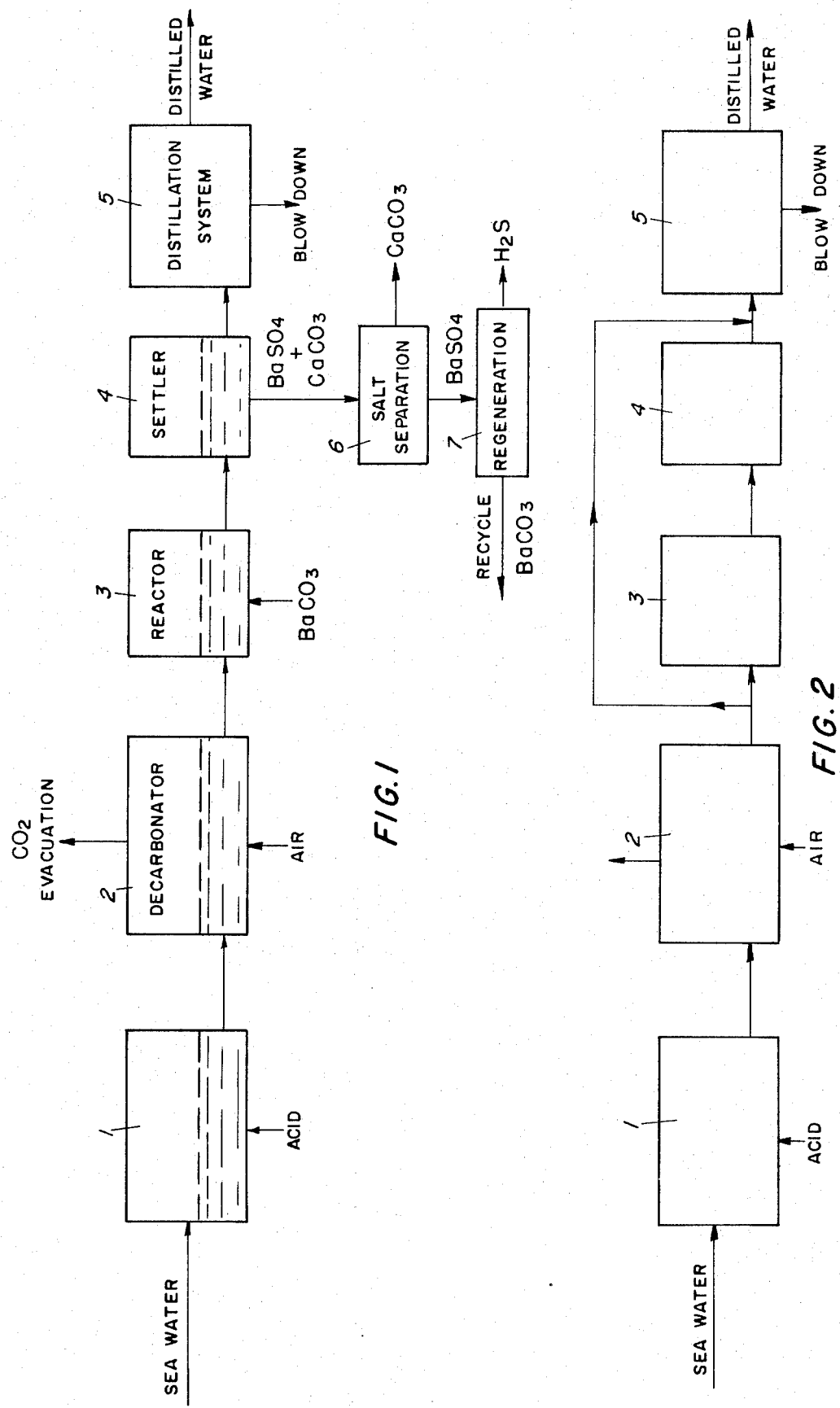

3,725,268
SOFTENING OF SEA WATER BY ADDITION OF BARIUM CARBONATE AND MINERAL ACID
P. Gideon Gelblum, Philadelphia, Pa., assignor to the United States of America as represented by the Secretary of the Interior
Filed Feb. 14, 1972, Ser. No. 225,941
Int. Cl. C02b 5/02
U.S. Cl. 210—53    14 Claims

ABSTRACT OF THE DISCLOSURE

To reduce or prevent scaling during distillation, barium carbonate and small, catalytic amounts of mineral acid or its oxide are added to sea water to form barium bicarbonate in situ, which rapidly reacts with sulfate and calcium, and forms a precipitate consisting essentially of barium sulfate and calcium carbonate.

---

This invention relates to softening sea water prior to evaporation or distillation.

To overcome formation of scale on heat transfer surfaces, efforts have heretofore been made to remove scale-forming calcium and magnesium salts prior to heating and distillation of sea water. However, there has been little success in developing rapid and effective methods for removing substantially all these salts. Classical boiler feed water techniques have been capable of removing only up to 80% of the calcium ions in set water. Barium carbonate has been employed in an effort to soften sea water by reacting it with $CaSO_4$ to form such salt precipitates as $BaSO_4$, $CaCO_3$, and $MgCO_3$, as described in U.S. Pat. No. 3,525,675. However, barium carbonate is substantially insoluble in water, and has to be ground to very fine powder prior to its use. Even then this latter process requires excessively long and impractical reaction times.

In boiler feed water technology, it is known that water soluble barium bicarbonate, a much more expensive compound than $BaCO_3$, will rapidly react with calcium sulfate, which bicarbonate can be formed in situ by adding $BaCO_3$ to the water in the presence of $CO_2$. However, the large amounts of $CO_2$ required to stoichiometrically convert all the $BaCO_3$ to $Ba(HCO_3)_2$ prevents the precipitation of $CaCO_3$ in that the $CaCO_3$ remains in solution as $$Ca(HCO_3)_2$$

In this regard, the prior art (e.g., U.S. Pat. No. 466,709; British Pat. No. 20,591, A.D. 1908; and British Pat. No. 203,886) teaches that the resultant bicarbonate of calcium as well as that of magnesium, can be subsequently removed by heating or liming the sulfate-depleted solution. This multistep approach provides obvious drawbacks in the softening of sea water prior to a distillation operation. For example, liming the sea water introduces further salt problems. Additionally, so for as is known, prior to the present invention the barium bicarbonate reaction mechanism has not been explored with set water; and sea water presents somewhat different problems than boiler feed water in that sea water contains much higher concentrations of sulfate, calcium and magnesium in addition to high concentrations of sodium and chloride ions, etc.

I have now discovered that, in the softening of sea water, a rapid reaction between calcium sulfate in the sea water and barium bicarbonate can be effected through the formation of the bicarbonate in situ by adding barium carbonate to sea water previously acidified with a mineral acid (or its oxide) which is present in amounts far less than that required to stoichiometrically convert all the insoluble barium carbonate to the soluble bicarbonate.

Since only comparatively small amounts of acid are injected into the sea water, calcium carbonate can form, which simultaneously precipitates with the barium sulfate. It is believed that the reactions in the sea water proceed as follows (assuming sulfuric acid is employed):

Initiation of barium bicarbonate formation

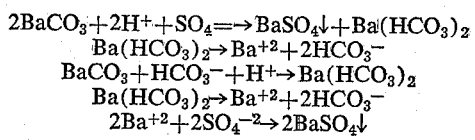

Propagation of barium bicarbonate formation

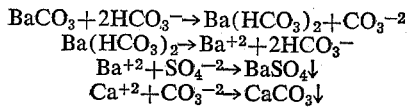

As seen from the above equations, once the bicarbonate ion is formed in solution, it reacts with and dissolves additional barium carbonate which rapidly propagates additional bicarbonate ion for dissolution of even more barium carbonate. In effect, the acid added to the sea water acts as a catalyst. More than 95% decalcification can be effected, and the reaction completes itself usually in less than 10 minutes. Essentially no magnesium is removed by the process.

It is therefore an object of the present invention to rapidly desulfate and decalcify sea water.

Another object is to essentially completely decalcify the sea water.

A still further object is to convert any $BaCO_3$ in a sea water environment to a $Ba(HCO_3)_2$ while externally supplying or forming in situ less than the stoichiometric amounts of $H^+$ ion necessary for such a conversion.

Yet another object is to precipitate calcium and sulfate without simultaneously precipitating magnesium.

Other objects and advantages will be obvious from the following more detailed description of the invention taken in conjunction with the drawings in which:

FIG. 1 is a schematic drawing of the process of the present invention; and

FIG. 2 is a modification.

Referring to FIG. 1 in the practice of the invention, the sea water is acidified in, for example, a vessel 1 with a mineral acid such as $H_2SO_4$, HCl or $HNO_3$ and their respective oxides, $SO_2$, $NO_2$, etc. The amount of acid depends upon the quantity of barium carbonate to be added after the acid. Generally, the mole ratio of acid to barium carbonate, expressed as $H^+$:Ba, is about 1:100 to 1:5, preferably about 1:50 to 1:20 which is only a minute amount of the acid stoichiometrically required to convert all the $BaCO_3$ to $Ba(HCO_3)_2$.

Besides establishing the requisite amount of $H^+$ ion in the sea water, the acid also has the additional well known effect of converting carbonate and bicarbonate ion (originally present in the sea water) to $CO_2$. Prior to adding the barium carbonate to the acidified water, it is desirable to remove this $CO_2$ as it tends to interact with $H^+$ ion and thereby prevent to some extent calcium carbonate precipitation when the $BaCO_3$ is added. Such decarbonation can be accomplished by reducing the pressure above the water, and simultaneously stripping the water with air or steam in vessel 1 or in a separate decarbonator vessel 2.

Barium carbonate is then added in particulate or slurry form to the acidified-decarbonated water in, for example, vessel 3. It is not necessary to finely grind the $BaCO_3$ since coarse particles rapidly dissolve in the $H^+$ environment. Agitation (not shown) can be employed to bring about intimate contact between the reactants in the sea water.

As to the amount of $BaCO_3$ to be added, it is dependent upon the desired degree of calcium and sulfate removal; and the following must be taken into consideration:

(a) For every mole of calcium in sea water there are about three moles of sulfate;

(b) The reaction mechanism of the present invention (see above formulas) proceeds essentially stoichiometrically with regard to all the calcium but not with regard to sulfate; and (c) As to sulfate removal, the addition of barium carbonate beyond the amount required to stoichiometrically react with about 40–50% of the sulfate essentially will not remove any more sulfate in that the barium carbonate will not dissolve beyond this amount because barium sulfate crystals tend to coat the barium carbonate.

Accordingly, the addition of just enough barium carbonate to remove all the calcium results in the removal of about ⅓ of the sulfate. Alternatively, just enough barium carbonate can be added to remove about 40–50% of the sulfate which thereby supplies more than enough carbonate ion to remove substantially all the calcium. If it is desired to substantially completely desulfate the water, a plurality of separate acid-barium carbonate treatment zones can be provided through which the sea water serially travels.

Generally, the water temperature during the $$Ba(HCO_3)_2\text{-}CaSO_4$$

reaction is about 60° F. to 170° F., preferably about 100° F. to 140° F. The reaction completes itself in about 5–10 minutes. Thereafter the $BaSO_4$-$CaCO_3$ joint precipitate is allowed to settle out of the softened sea water by gravity in the reaction vessel 3 or in a separate clarifier vessel 4. Settling usually takes less than 1 hour. Temperatures above 100° F. effect more rapid settling. For example, at a temperature of about 140° F., the precipitate settles out usually within ten minutes. Centrifugal force, drag force enhancers, etc., may be employed to accelerate precipitate separation.

Softened sea water overflow from the settler is sent to the distillation system 5 while the underflow, usually consisting of 30 to 50 weight percent solids, is sent to a salt recovery unit 6 and barium carbonate regeneration system 7 as described in copending application S.N. 225,940.

Referring now to FIG. 2, in practice it is often not desirable to remove more than 60–70% of the calcium from sea water. That is, the operating conditions of the distillation system will be such that there are no scale problems provided that the sea water is 60–70% decalcified (equimolar amounts of sulfate also having been removed). Accordingly, since the present invention readily removes more than 95% of the calcium from a body of water, it will only be necessary to treat a fraction of the sea water stream being sent to the distillation system (as shown in FIG. 2) in order to decalcify the total amount of sea water to the extent of 60–70%. This of course, results in a smaller and more economic operation.

The following example shows the effectiveness of the process of the present invention.

EXAMPLE

A sample of raw sea water containing 2873 p.p.m. $SO_4$, 368 p.p.m. calcium, total alkalinity ($CO_3$ and $HCO_3$ ion) 113 p.p.m., and pH 7.8 was treated with small amounts of sulfuric acid to lower the pH to about 5. The water was then decarbonated in the prior art manner and then contacted with about .6 mole of barium carbonate per mole of sulfate in the sea water. The resultant $H^+$:barium mole ratio was about 1:20. The reaction was allowed to proceed for about 5 minutes, and the resultant precipitate was allowed to settle. The precipitate consisted essentially of calcium carbonate and barium sulfate, and small amounts of unreacted barium carbonate.

The softened water was about 96% decalcified and about 50% desulfated.

I claim:

1. A process for softening sea water so as to prevent scaling during subsequent heating and evaporation of said water consisting essentially of:

(a) adding barium carbonate to said sea water;

(b) prior to adding said barium carbonate, adding a mineral acid or its oxide to said water in an amount such that, after addition of said carbonate, the $H^+$: barium mole ratio is about 1:100 to 1:5 and in an amount sufficient to form a precipitate consisting essentially of $BaSO_4$ and $CaCO_3$; and (c) after said barium carbonate is added, removing from said water a precipitate consisting essentially of $BaSO_4$ and $CaCO_3$.

2. The process of claim 1 wherein the amount of barium carbonate which is added to said water, expressed in relation to the calcium and sulfate ion content of said water, ranges from a barium:calcium mole ratio of about 1:1 to a barium:sulfate mole ratio of about .5:1.

3. The process of claim 1 wherein after addition of said acid and prior to addition of said barium carbonate, said water is decarbonated.

4. The process of claim 1 wherein the temperature of said water throughout all of said steps is about 60° F. to 170° F.

5. The process of claim 1 wherein said $H^+$:barium mole ratio is about 1:50 to 1:20.

6. The process of claim 1 wherein said mineral acid is selected from the group consisting of sulfuric, hydrochloric and nitric acid.

7. The process of claim 3 wherein the temperature of said water throughout all of said steps is about 60° F. to 170° F.

8. The process of claim 3 wherein said $H^+$:barium mole ratio is about 1:50 to 1:20.

9. The process of claim 3 wherein said mineral acid is selected from the group consisting of sulfuric, hydrochloric and nitric acid.

10. The process of claim 8 wherein the temperature of said water throughout all of said steps is about 60° F. to 170° F.

11. The process of claim 10 wherein said mineral acid is selected from the group consisting of sulfuric, hydrochloric and nitric acid.

12. The process of claim 11 wherein said temperature is about 100° F. to 140° F.

13. The process of claim 12 wherein the amount of barium carbonate which is added to said water, expressed in relation to the calcium and sulfate ion content of said water, ranges from a barium:calcium mole ratio of about 1:1 to a barium:sulfate mole ratio of about .5:1.

14. The process of claim 1 wherein said $H^+$ ion in step (b) is formed in situ by adding $SO_2$ or $NO_2$ to said water.

References Cited

UNITED STATES PATENTS

| 413,432 | 10/1889 | Bradburn et al. | 210—53 |
| 466,709 | 1/1892 | Bradburn et al. | 210—53 |
| 3,525,675 | 8/1970 | Gaudin | 203—7 |

FOREIGN PATENTS

| 208,886 | 9/1923 | Great Britain | 210—53 |

OTHER REFERENCES

Chem. Abstracts, vol. 28, 2439-4.

MICHAEL ROGERS, Primary Examiner

U.S. Cl. X.R.

159—DIG. 13; 203—7; 210—56, 57; 423—554